(12) United States Patent
Mangs et al.

(10) Patent No.: US 9,065,980 B2
(45) Date of Patent: Jun. 23, 2015

(54) METHOD FOR RETRANSMISSION USING CHECKSUMS FOR IDENTIFYING LOST DATA PACKETS

(75) Inventors: Jan-Erik Mangs, Solna (SE); Joacim Halen, Sollentuna (SE); Johan Kolhi, Vaxholm (SE); Victor Souza, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 323 days.

(21) Appl. No.: 13/499,806

(22) PCT Filed: Oct. 2, 2009

(86) PCT No.: PCT/SE2009/051096
§ 371 (c)(1),
(2), (4) Date: Sep. 11, 2012

(87) PCT Pub. No.: WO2011/040850
PCT Pub. Date: Apr. 7, 2011

(65) Prior Publication Data
US 2013/0007823 A1    Jan. 3, 2013

(51) Int. Cl.
| | |
|---|---|
| *H03M 13/00* | (2006.01) |
| *H04N 7/173* | (2011.01) |
| *H04L 1/00* | (2006.01) |
| *H04L 1/18* | (2006.01) |
| *H04N 21/6375* | (2011.01) |
| *H04N 21/6377* | (2011.01) |
| *H04N 21/658* | (2011.01) |
| *H04L 29/06* | (2006.01) |

(52) U.S. Cl.
CPC .......... *H04N 7/17318* (2013.01); *H04L 1/0061* (2013.01); *H04L 1/1832* (2013.01); *H04L 1/1838* (2013.01); *H04N 21/6375* (2013.01); *H04N 21/6377* (2013.01); *H04N 21/658* (2013.01); *H04L 65/4076* (2013.01)

(58) Field of Classification Search
USPC ......................................................... 714/776
See application file for complete search history.

(56) References Cited

U.S. PATENT DOCUMENTS

| | | |
|---|---|---|
| 2003/0066016 A1 | 4/2003 | Wehage |
| 2005/0185604 A1 | 8/2005 | Agarwal |

(Continued)

FOREIGN PATENT DOCUMENTS

| | | |
|---|---|---|
| EP | 2053774 A1 | 4/2009 |
| GB | 2418115 A | 3/2006 |

OTHER PUBLICATIONS

Author: Edward J. Beroset; Title: On the Interaction between Checksums and Cyclic Redundancy Codes in Communications Protocols; Publisher: 78-1-4799-3653-3/14, 2014 IEEE.*

(Continued)

*Primary Examiner* — April Y Blair
*Assistant Examiner* — Thien D Nguyen (57) ABSTRACT

The present invention relates to a method for retransmission of lost data, a receiving device operating according to the invented method and a retransmission server. In the absence of a unique identifier per data packet or data frame, there is obviously a problem to directly identify a specific data packet, data block or data frame in the stream and retransmission can't take place with current technologies. The object of the present invention is to offer a retransmission method and means for making said retransmission of missing data packets possible in the absence of a unique identifier.

20 Claims, 6 Drawing Sheets

(56) References Cited

U.S. PATENT DOCUMENTS

| | | | |
|---|---|---|---|
| 2007/0133566 A1* | 6/2007 | Copps | 370/395.52 |
| 2008/0151881 A1 | 6/2008 | Liu | |
| 2008/0248758 A1* | 10/2008 | Schedelbeck et al. | 455/69 |
| 2008/0285476 A1* | 11/2008 | Rajakarunanayake | 370/252 |
| 2008/0285945 A1* | 11/2008 | Rajakarunanayake et al. | 386/92 |
| 2008/0288740 A1* | 11/2008 | Gaerber | 711/200 |
| 2008/0310316 A1 | 12/2008 | Oran | |
| 2009/0217318 A1* | 8/2009 | VerSteeg et al. | 725/32 |

OTHER PUBLICATIONS

Bova, T., et al., "Reliable UDP Protocol," draft-ietf-sigtran-reliable-udp-00.txt, Internet Draft, Feb. 25, 1999.

Braden, R., et al., "Computing the Internet Checksum," RFC 1071, Sep. 1988.

\* cited by examiner

METHOD FOR RETRANSMISSION USING CHECKSUMS FOR IDENTIFYING LOST DATA PACKETS

TECHNICAL FIELD

The present invention relates to a method for retransmission of lost data, a receiving device operating according to the invented method and a retransmission server.

BACKGROUND

Internet Protocol (IP) networks have become a widely used data infrastructure for delivering digital information e.g. data, voice and streaming video, both locally and world wide. An increasing amount of data traffic delivered over IP networks contains multimedia content.

In a system for delivering media content, said content is most often compressed. There are servers for sending out the media content and receivers for receiving the media content.

TCP (Transport Control Protocol) and UDP (User Data Protocol) are transport protocols used for transporting said media content. The UDP protocol is less complex than TCP, but it does not offer a number of TCP features that can make TCP so useful in certain applications, such as guaranteeing against lost, duplicated, or out of order packets. With the UDP implementation, an application process at the server segments the data into blocks, encapsulates them into UDP and then IP packets, and then delivers them over the IP network with best efforts, i.e. without waiting for receiving acknowledgement. As a result, there is no retransmission of packets and no sliding windowing buffers. A server using UDP is thus capable of delivering data blocks very efficiently without the need to hold the data in its buffer and wait for confirmation, but lost and out-of-order packets are not reported to the server. Therefore, UDP transport does not ensure data delivery and is usually suitable only for use in reliable networks or for situations where unreliable data delivery is acceptable by the end applications.

Compressed data, such as Moving Picture Expert Group 2-Transport stream (MPEG2-TS) is extremely sensitive to data packet loss. Lost packets mean bad end user experience. Retransmission of lost video packets is often an essential function in IPTV networks and the solutions implementing retransmission typically use Real-time Transport protocol (RTP).

RTP transport provides a mechanism for detecting lost packets by implementing a sequence number for each video packet number for each video packet. RTP retransmission is known and standardized. In the RFC4548 an RTP payload format for performing retransmission is defined.

The most common way of transmitting video is using MPEG2-TS over UDP. Video is sensitive for packet loss. Considering the packet loss issue, MPEG-TS is not worse than any other transport protocol. It is the loss of video encoded data itself when UDP packets are lost that is a problem.

As UDP is in itself unreliable, any retransmission of lost traffic must be handled on the application level. Since both UDP and MPEG2-TS lacks a unique identifier per packet, there is obviously a problem to directly identify a specific data packet, data block or data frame in the stream and retransmission can't take place with current technologies.

SUMMARY

The object of the present invention is to offer a retransmission method and means for making said retransmission of missing data packets possible in the absence of a unique identifier.

The above problem is solved according to the invention by making use of checksums in the UDP headers for a sequence of data frames surrounding missing data packets or block of data packets to identify said packets. Said checksums are used as an identification key, which is sent to a retransmission server which temporary keeps a copy of all the data packet sequence earlier sent to a receiver. The retransmission server is by means of said identification key capable of identify said lost data and retransmit the missing data packets to the requesting receiver, which will insert them in the correct place in the total data packet stream before said missing data is to be rendered.

According to one aspect of the present invention, a method is provided for retransmission of data packets in the absence of sequence numbers. The data packets are sent in data frames, each frame comprising a checksum, during a data transmission of a session between a data transmitter and a receiving device. The method comprises the steps of:
detecting data loss in the data stream transmission;
determining the checksums of at least the received adjacent data frames enclosing the detected data loss;
sending an identification key comprising said determined checksums to a retransmission server, whereby the sent checksums are constituting a checksum sequence and said identification key is used by the server for identifying of the data loss;
receiving the requested missing data comprising at least one data frame from the retransmission server;
interleaving the received at least one data frame in the correct place in the received data transmission before rendering the data information of the data transmission.

According to another aspect of the present invention, a receiving device is provided for retransmission of data packets in the absence of sequence numbers. The data packets are sent in frames, each frame comprising a checksum, during a data transmission of a session from a data transmitter to the receiving device, which comprises:
detecting means (being adapted to detect data loss in the data stream transmission;
determining means being adapted to determining the checksums of at least the received adjacent data frames enclosing the detected data loss;
sending means adapted to send an identification key comprising said determined checksums to a retransmission server, whereby the sent checksums are constituting a checksum sequence and said identification key is used by the server for identifying of the data loss;
receiving means being adapted to receive the requested missing data comprising at least one data frame from the retransmission server;
interleaving means being adapted to interleave said received at least one data frame in the correct place in the received data transmission before rendering the data information of the data transmission.

According to yet another aspect of the present invention, a retransmission server is provided for retransmission of data packets in the absence of sequence numbers. The data packets are sent in frames, each frame comprising a checksum, during a data transmission of a session from a data transmitter to at least one receiving device. The retransmission server comprises a buffer storage and means for storing the sent data frames in the buffer storage. The retransmission server is adapted to receive an identification key from a retransmission requesting receiving device, and wherein said identification key comprises checksums of the sent data frames. The received checksums are constituting a checksum sequence, and said identification key is used by the retransmission server for identifying stored data frames and/or data packets, which the retransmission server is adapted to send to the requesting receiving device.

Different embodiments of the method, the receiving device and the retransmission server is provided in the enclosed dependent claims.

One advantage of the present invention is that it is applicable with any of the existing data transmissions standards.

Further one advantage is that the present invention works equally well for protocols with and without sequence numbers.

Yet another advantage is that the invention provides a possibility to repair UDP streams without the consuming end nodes ever seeing the problem if the retransmission function is implemented in the network, e.g. residential gateway, access node, etc.

BRIEF DESCRIPTION OF THE DRAWINGS

Different embodiments of the present invention will now be described and discussed in more detail hereinafter with reference to the following submitted drawings.

DETAILED DESCRIPTION

The present invention relates to retransmission of lost data that once was sent without a unique packet sequence number per session. In the following description, the present invention will be presented and described when implemented in Media service network, such as an Internet Protocol Television (IPTV) network and system. However, the present invention is not limited to the described application. As will be understood by the following description, the invention is also applicable in other application areas wherein data transmission of data packets missing a unique packet sequence number per session between a sender and a receiver is used. A session is considered to be a TCP/UDP session or similar, wherein an amount of data is transferred in one or a number of sequences from a transmitter to a receiver. As an example, the transfer of a video stream is a session.

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced and other embodiments that depart from these specific details. In other instances, detailed descriptions of well known methods, devices, and circuits are omitted so as not to obscure the description of the present invention with unnecessary detail.

Figure 1:
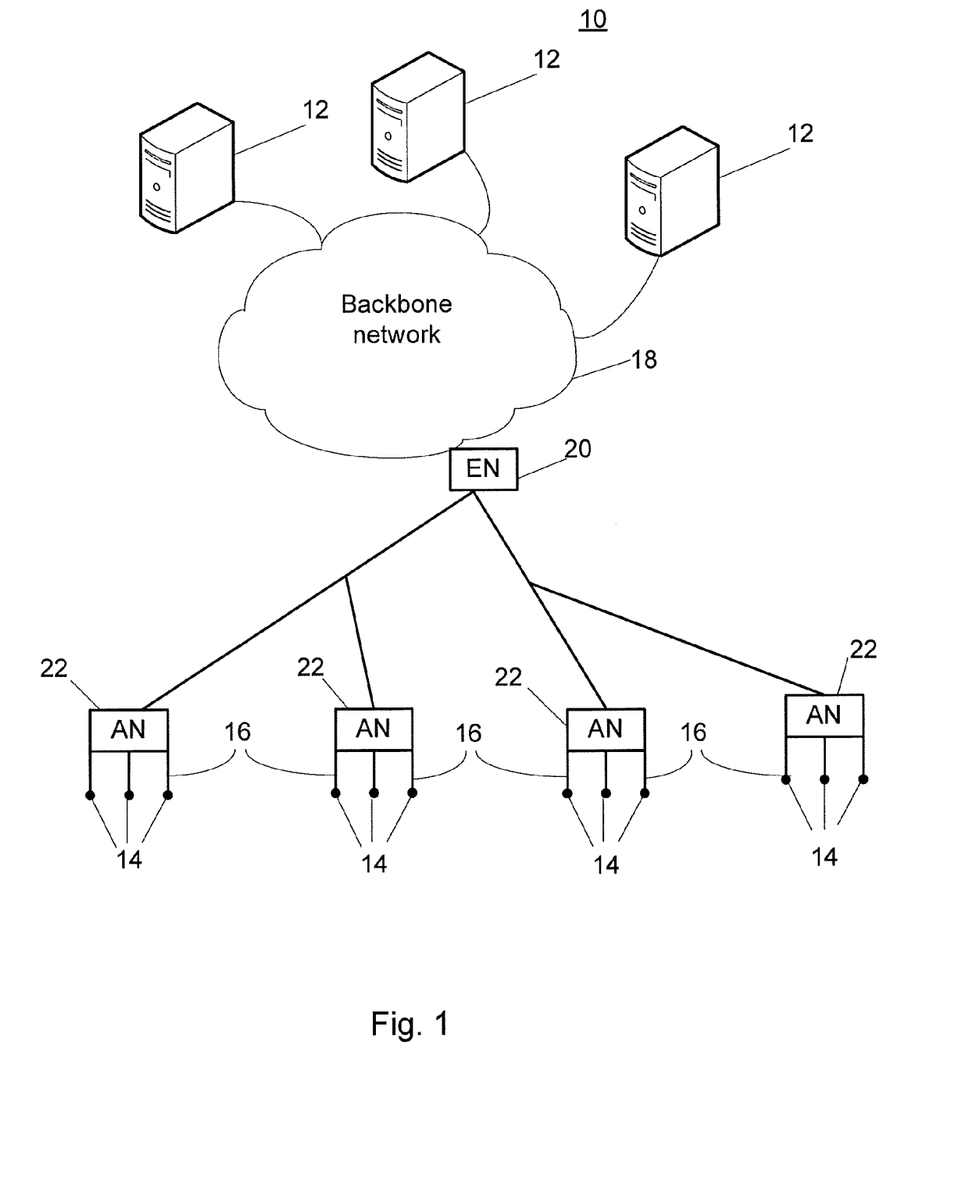
FIG. 1 is a block diagram showing schematically a Media Service network and system according to prior art.

FIG. 1 is a block diagram showing schematically a Media Service network and system 10, such as e.g. an Internet Protocol Television (IPTV) network and system. The Media service system is comprising a number of data transmitters 12 in sender nodes, which in this example are Media service suppliers 12, here also denoted operators, offering movies, television programs, etc., to their customers or subscribers in reception nodes 14 in the network. The customers or subscribers will hereafter be denoted end users. Each end user will be able to watch or store the received movie, television program on a rendering device, such as a television set with or without a Set-Top Box, Video Compact Recorder (VCR), Personal Computer (PC), or any thing comprising a suitable decoder to which a rendering device, such as a displaying device, is connectable for viewing. The end user side may therefore be configured in a variety of ways. The herein described or mentioned examples are therefore examples which are non-limiting for the scope of the present invention.

Further, each end user will receive, or down load, data packets comprising the media coded data information during a down load session. A down load session is the period from the moment when an end user starts receiving data packets to the moment when said end user finishes the down load. As understood by a skilled person, a plurality of sessions will be present at the same time in the Media service network/system. The amount of down load sessions, here denoted session load, will be limited by the system capacity. As the number of end users grows, a service supplier has to extend the system capacity, e.g. by extending the number of streaming servers at the Service supplier centre. Thus, each end user may be provided with data packets from any of the video service suppliers streaming servers.

During a session, the uploading media streaming server 12 will send streaming data packets through the network, comprising a network backbone 18. The data packets are routed at a backbone edge node 20 to the correct access node 22, which routes the data packets to the addressed end user on the end user's access link 16. The streamed data may be sent in frames comprising a number of data packets. Said frames may be transported in Internet Protocols.

Figure 2:
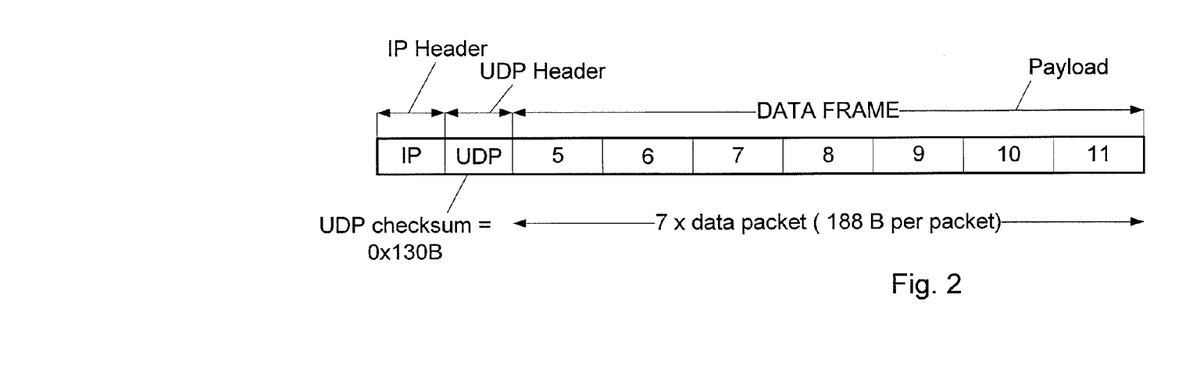
FIG. 2 is an illustration of the Internet Protocol (IP)

In FIG. 2, an Internet Protocol (IP) packet is illustrated. The Internet Protocol is in itself well-known and standardized, and it will therefore not be described herein in more detail than that it comprises an IP header and payload. In this case, the payload is carrying a data frame with a number of data packets, in the figure denoted 5-11, e.g. User Datagram Packets (UDP) as illustrated in said figure. As an example presented in FIGS. 3a and 3b, the UDP payload may be composed of units of an MPEG2-Transport Stream, each Transport Stream (TS) unit is 188 bytes long and the data frame is carrying seven TS units. The data in the frame and packets may be any kind of digital encoded information, like media e.g. video, sound, as well as other continuously streaming data, e.g. measured values of parameters. As a standard, the UDP datagrams carry a checksum for the contents of the payload and parts of the header. The checksum is inserted by means of the equipment at the transmitting site. Further, each MPEG2-TS header (not shown) is carrying a short sequence number, a continuity checker that is only four bites long. An MPEG-TS unit is therefore uniquely numbered within a sequence of 16 data units, numbered from 0-15 (see FIG. 3a). One or more missing data packets within the range of said 16 packets could be uniquely identified and restored. However, in longer data transmission sessions, especially using very high bit rates, said 16 number series will repeat itself a plurality of times even within a very narrow time window. Therefore, a number of UDP data packets will have the same MPEG-TS continuity checks. An identification of the correct missing data packets within a time window allowing longer sequences than 16 data packets is therefore not possible without another identification method.

According to the present invention, it is therefore suggested to use UDP checksums as an identification key to solve the problem of identifying missing data packets or block of data packets. Due to the fact that the payload within a frame of data packets will vary considerably, the possibility of two checksums having the same checksum value within a short time window will be negligible. The possibility for finding two pair of consecutive checksums is under said circumstances close to non-existent as an identification key. Therefore, the checksums of the data frames may be used as unique session sequence series wherein each data frame checksum is considered as a nearly unique sequence number for a data frame for a whole data transmission session. However, in data transmission sessions where the variation of checksums is moderate, the possibility for similar checksums is higher than in data transmission sessions having considerable variation in the content of the data frame payload.

It is therefore suggested in the present invention, to use a at least a pair of UDP checksums in an identification key when requesting for a retransmission of lost data that should have been received in a data transmission session. UDP checksums are well-known in the prior art and defined by the corresponding standard, see e.g. document enclosed in http://www.ietf.org/rfc/rfc1071.txt. The first checksum of said two checksums to be used is the checksum of the last correctly received data frame preceding the detected data loss and the second checksum of said two checksums to be used is the checksum of the first correctly received data frame following directly upon the detected data loss in the stream.

Figure 3A:
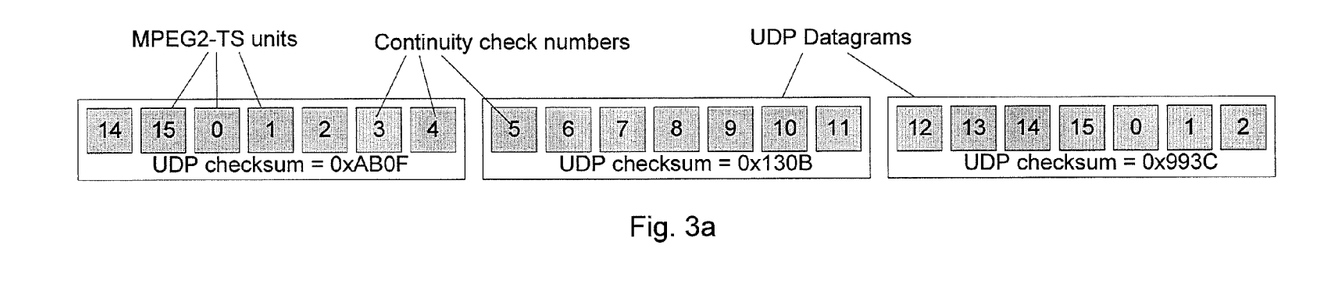
FIGS. 3a and 3b are illustrations of a sequence of data frames in a block of a transmission stream.
Figure 3B:
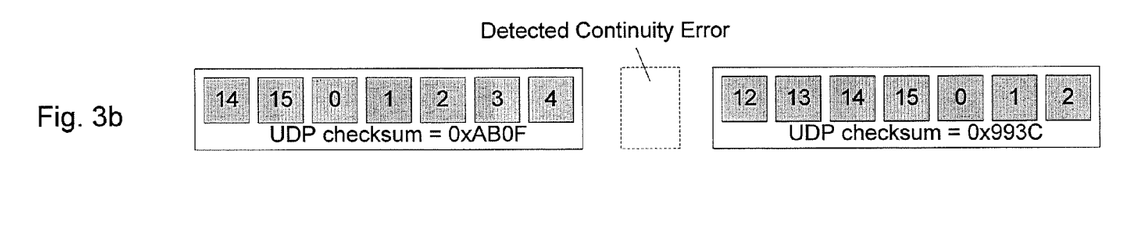

With reference to FIGS. 3a and 3b, the above described principle of forming an identification key will hereafter be described.

In FIG. 3a, a complete sequence of data frames in a block of a regular data transmission stream from a transmitter to a receiver is illustrated. The first frame in the illustrated data transmission stream has the UDP checksum 0xAB0F, the next following data frame has the checksum 0x130B, and the consecutive data frame 0x993C.

In FIG. 3b is illustrated the same block of data frames as in FIG. 4a but one of the datagrams in the sequence is missing. The receiving unit is provided with means to read the continuity checker numbers in the MPEG-TS headers and it detects a continuity error in the series of numbers, i.e. data packets 5 to 11 are missing. According to the invention, the receiving unit is configured to start a retransmission process as soon as a data loss is detected and in which process the first checksum is determined to be the last checksum of the correctly received data frame preceding the detected data loss, which is the frame with the checksum 0xAB0F. Said checksum is saved as $CS_1$. The retransmission process than checks for the first correctly received data frame following directly upon the detected data loss in the stream, which is the data frame having the checksum 0x993C. Said checksum is saved as $CS_2$. The receiving unit is then configured to send said checksums $CS_1$ and $CS_2$ as an identification key in a request message to a retransmission server, which is capable of identifying the missing data by means of the identification key and re-transmit said missing data to the requesting receiving unit.

If an improved identification key is wanted, more checksums than the two checksums of the two closest frames surrounding the detected data loss may be included in the identification key. As an example, further one or two of the data frames preceding the two closest frames surrounding the detected data loss may as well as one or two of the data frames following the two closest frames surrounding the detected data loss may contribute with their checksums. In that case, the key involves a unique series of checksums that will improve the identification of the lost data thereby ensuring a safer retransmission of the correct missing data.

The identification key may also involve time stamps corresponding to the reception of each checksum enclosed in the request message. The time stamps will also improve the identification of the lost data in the retransmission server.

One aspect of the present invention is a method for retransmission of data packets in the absence of unique session sequence numbers. The data packets are sent in frames in transport protocols, e.g. in User Datagram Protocols, during the data transmission of a session between a transmitter, such as a streaming media server, and a receiving device.

Figure 4:
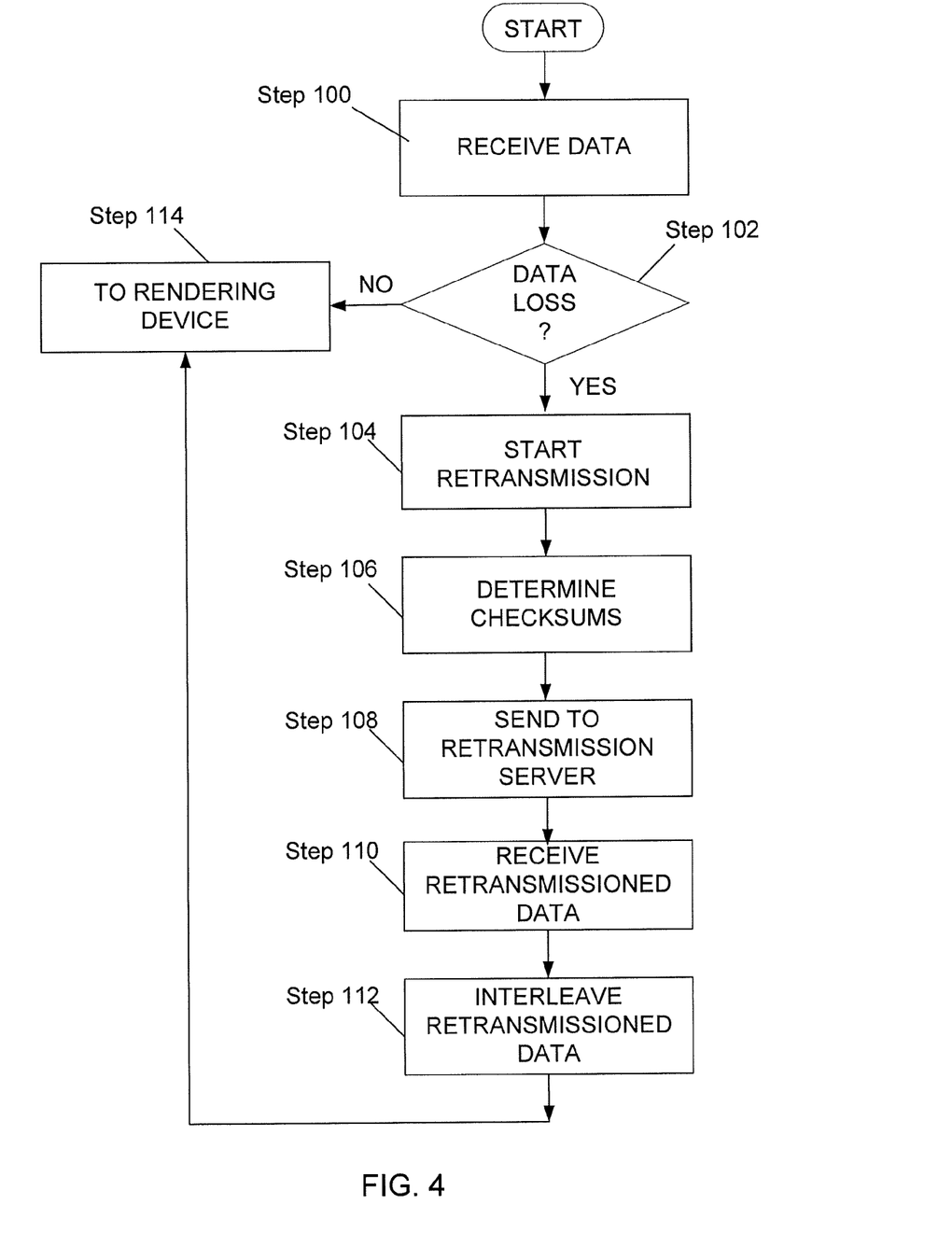
FIG. 4 is a flowchart of an embodiment of the method according to the invention.

In FIG. 4, a flowchart of an embodiment of the method according to the invention is illustrated. Means for continuously detecting data loss in the data stream transmission of data packets is provided in an end user's reception node. During a data transmission session, the reception node equipment is capable of receiving, step 100, checking the stream of incoming data and data packets for missing data and to start the retransmission process as soon as the a data loss is detected. Such a check is performed during the whole data transmission session, and the data transmission session and the reception of data is not interrupted when a loss of data is detected. Different ways of detecting loss of data or data packets are applicable, but how the loss is detected is not a main issue for the present invention. A number of such data loss methods are already known in the state of the art and could be used. The invented method for retransmission of data will not start until a data loss is detected, steps 102 and 104, as illustrated in FIG. 4. After detecting data loss in the data stream transmission, the retransmission process continuous with the next step, step 106, in which the checksums of at least the received adjacent data frames enclosing the detected data loss is determined. Said checksums are read from the User Datagram Protocol (UDP) header and the checksums are used by the retransmission process as identification keys to be able to locate the lost data and/or data packets. Thus, two checksums will constitute an identification key. In the next step, step 108, said identification key is sent to a retransmission server. The retransmission server is a server that is configured to record all data sent to a receiver and save all data for predetermined length of time, hereafter denoted time window. The sent checksums constitute a checksum sequence and said identification key is used by the server to identify the data loss. As soon as the requested data loss is identified by the server, it sends on the same link as the regular data stream transmission is sent by the transmitter the requested missing data or data packets to the requesting receiving node, i.e. the requesting client.

In the next step, step 110, the receiving node receives the requested missing data comprising at least one data frame from the retransmission server. Hence, the receiver will receive in the regular stream of data and data packets, a block of missing data. The receiver is therefore capable of identify said block of data and interleave the received at least one data frame in the correct place in the received data of the data transmission session, step 112, before rendering the data information of the data transmission, step 114.

Different embodiments of the above described invented method is also provided. In one embodiment of the method, more checksums than the two checksums of the two received adjacent data frames enclosing the detected data loss are detected and sent to the retransmission server as an identification key thereby facilitating the identification of the correct data loss.

In further one embodiment of the method, the identification key is comprising the time stamps of said checksums, each time stamp corresponding to a data frame and its checksum recorded at the reception of the data frame.

In yet one embodiment of the method, the sending of the identification key is performed by including said identification key in a Request message which is sent to the retransmission server.

As already discussed above, the data transmission may involve User Datagram Protocol stream comprising MPEG2-TS units wherein each has a continuity (order) number. According to one embodiment of the invention, said continuity number is used for detecting data loss in the data transmission in the detecting step and it could also be used in the identification key.

The present method is as stated above possible to apply in a number of technical fields wherein transmission of data is used. Such a technical field is Internet Protocol Television systems wherein the data transmission session is an IPTV transmission utilizing MPEG-TS.

The present invention is also providing a receiving device in a reception node for handling retransmission of data packets in the absence of sequence numbers.

Figure 5:
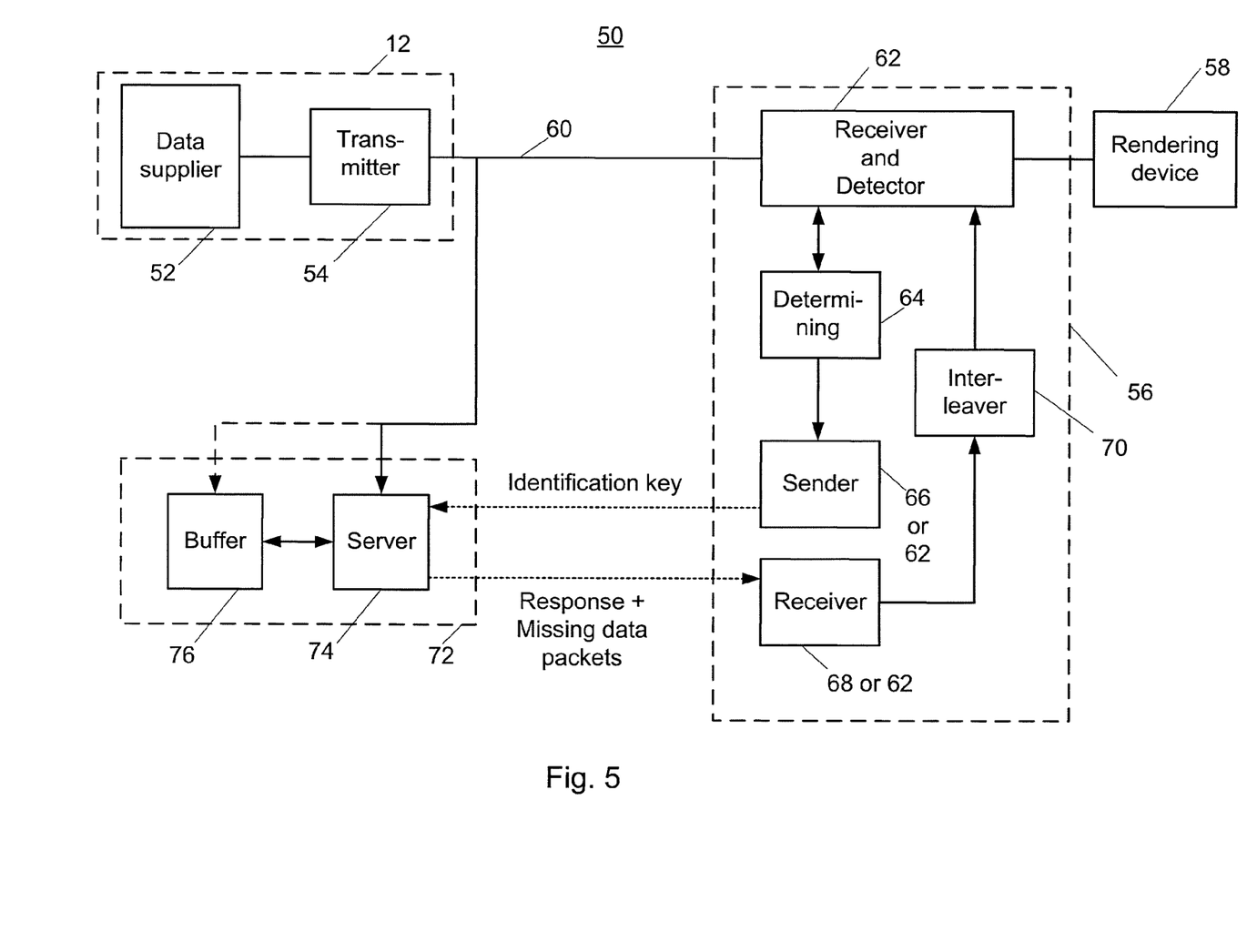
FIG. 5 is a block diagram schematically illustrating a data transmission system comprising a receiving device according to the invention.

In FIG. 5 a data transmission system 50 is schematically illustrated. The system comprises sender nodes and reception nodes. In a sender node is situated a data supplier 52, e.g. a media server, and a data frame transmitter 54 for sending data packets provided by the supplier in a regular data transfer session to an end user's reception node comprising a receiving device 56 according to the present invention. To said receiving device 56 is connected a rendering device 58 for presenting the information received in the received data. The data packets are sent and/or routed over a network (10 in FIG. 1) on a transmission link/path 60 in frames during a data transmission of a session between the streaming transmitter and the receiving device 56.

The receiving device 56 is configured to operate in accordance to the above described invented method and is therefore provided with means and functionalities for implementing said retransmission process. The receiving device 56 therefore comprises a suitable data transmission receiver 62 comprising detecting means 63, i.e. a data loss detector, for detecting data loss in the data stream transmission during the reception of the data stream. Said receiving device 56 is further comprising a determining means 64 being adapted to determine the checksums of at least the received adjacent data frames enclosing the detected data loss. Additionally, the receiving device 56 is provided with sending means 66 adapted to send an identification key comprising said determined checksums to a retransmission server 72, whereby the sent checksums are constituting a checksum sequence and said identification key is used by the retransmission server 72 for identifying the data loss. Receiving means 68 is adapted to receive the requested missing data comprising at least one data frame from the retransmission server 72. Separate receiving means 68 and sending means 66 may not be necessary, because the sending of identification keys to an addressed retransmission server and the reception of the requested missing data may be handled of the data transmission receiver 62, which is configured to perform said operations. The receiving device 56 is further comprising interleaving means 70 being adapted to interleave said received at least one data frame in the correct place in the received data transmission before rendering the data information of the data transmission.

The data transmission system is provided with a retransmission server 72, which could be located at the same server node as the data frame transmitter 54, or somewhere else, e.g. in another node of the data transmission system. The retransmitter server comprises server control unit and a buffer. The retransmission server 72 will hereafter be described in more details with reference to FIG. 7.

Figure 6:
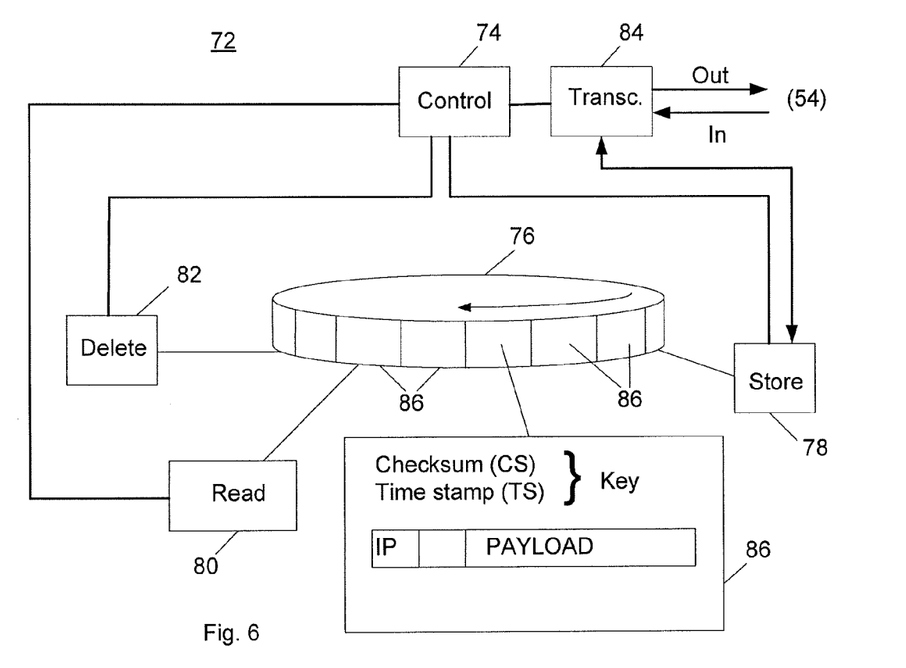
FIG. 6 is a block diagram schematically illustrating an embodiment of the retransmission server according to the invention.

In FIG. 6, an embodiment of the retransmission server 72 according to the invention is illustrated. The retransmission server comprises a buffer storage 76, e.g. a ring buffer, and a server control unit 74, which controls said buffer storage 76 and handles the communication of retransmission request messages comprising identification keys and response messages comprising missing data. The retransmission server is a server that is configured to record all data sent from a data supplier 52 to different receivers in reception nodes, identified by their IP addresses, over the connected network and save all data in the buffer storage for a predetermined length of time, denoted time window. The retransmission request messages comprise the IP addresses of the requesting receivers and at least one identification key generated of checksums, which constitutes a checksum sequence, and said identification key is used by the server 72 to identify the data loss, as already described above. As soon as the requested data loss is identified by the controller 74, it initiates the sending of the requested missing data or data packets to the requesting reception node, i.e. the requesting end user.

The retransmission server 72 may be configured in the following way according to one embodiment of the invention. It has a server control unit 74, e.g. a microprocessor, a central Processing unit, a Personal Computer, etc., for controlling the functional blocks of the server and for controlling the buffer storage 76. Said controller 74 controls a means 78 for storing the received data frames 86 in the buffer storage. Said means 78 for storing the received data frames is preferably connected directly to a data frame transmitter (54 in FIG. 5), e.g. a Media service server, but it could also be connected to a transmission link 60 from the data frame transmitter 54 in a suitable spot or node along the transmission link. Further, the retransmission server comprises a buffer storage reader 80 that identifies the requested data frames and which reads and/or copies the content of said requested data frames. The re-transmitter server further comprises a buffer storage data frame deleting means 82 that deletes every frame from the storage that is older than a preset time window. Said frame deleting means 82 is also controlled by the server controller. The server has also a server controlled transceiver block 84 that handles the reception of request messages comprising the identification key and the sending of response messages comprising the requested data frames, detected by the requesting unit as missing data.

The means 78 for storing the received data frames may be configured to add and/or register a time stamp to each data frame when the data frame is received. However, the retransmission server time stamps do not necessarily need to be synchronized with the receiver unit time stamps. Used in a suitable way, the retransmission server time stamps may increase the speed of identifying requested data loss frames in the buffer storage as the data frames are stored in the order they are received which also is in the time order they are received and stored. This fact may be used by the buffer storage reader to faster locate the requested data frames without reading every stored data frame of the session.

Figure 7:
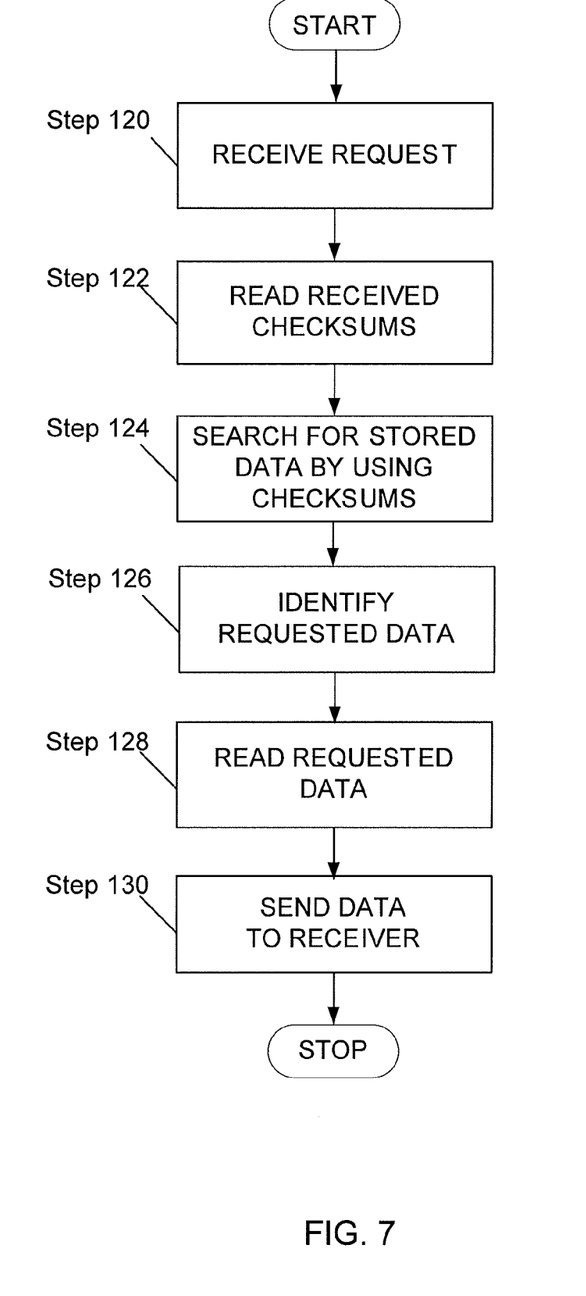
FIG. 7 is a flowchart illustrating a search process in a retransmission server.

FIG. 7 shows a flowchart illustrating the main steps in the retransmission server process and operation.

With reference to FIG. 7, the retransmission server 72 according to one embodiment of the present invention operates as follows. The retransmission server is configured to record all data sent to a receiver, identified by its IP address, on a transmission link in the network and save all data in the buffer storage 76 for a predetermined length of time, denoted time window. When the server controller 74 receives a request for retransmission of lost data in step 120, it reads the identification key with the checksums from the message in step 122. Thereafter, in step 124, the server controller 74 starts to search for the corresponding checksums of the stored frames in the buffer storage. In one embodiment of this search process, a hash table may be used. When the two checksums of the two closest frames surrounding the detected and requested data loss is identified and located in the buffer, step 126, the server controller initiates the reading, i.e. copying, by means of the buffer storage reader 80 the content of the frame or frames between said two frames, step 128. The server controller 74 inserts said frame or frames into an Internet Protocol as a response message, comprising the IP address of the requesting receiver, and thereafter send it to the addressed receiver, step 130. Different embodiments of the identification key, which has been described above could be used.

As mentioned above, a hash table may be used in the search process for identifying and locating the requested data frames.

Figure 8:
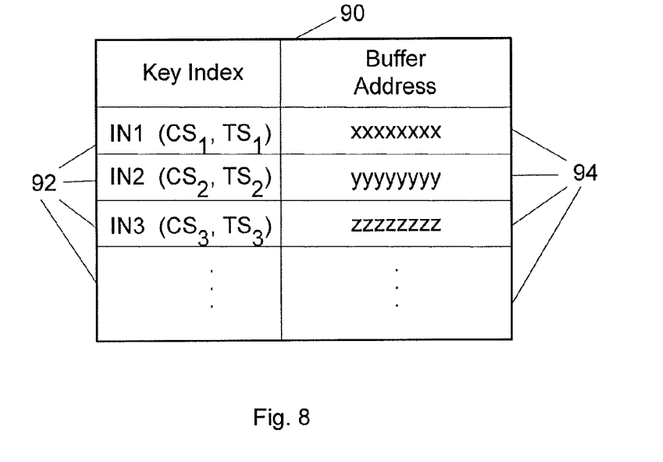
FIG. 8 is an illustration of a hash table for supporting the search process in the retransmission server.

In FIG. 8 is illustrated a hash table 90 for supporting the search process. Instead of using directly the received checksums $CS_1$ and $CS_2$ and the corresponding time stamp $TS_1$ and $TS_2$ for searching in the buffer storage, said checksums and time stamps may be transformed into search key hash indexes. The checksums and time stamps of stored data frames is also transformed into hash table key indexes 92, indicated as IN1 ($CS_1$, $TS_1$), IN2 ($CS_2$, $TS_2$), IN3 ($CS_3$, $TS_3$), . . . , and stored in the hash table together with the buffer storage addresses 94, indicated as xxxxxxxx, yyyyyyyy, zzzzzzzz, . . . , pointing to the corresponding location of the corresponding data frames. Each received checksum and time stamp must be transformed to a search key hash index. The transformation of all identification keys may be performed, either by the controller or by the storage buffer reader wherein the hash table may be located. The search key hash indexes are then used for searching for a corresponding hash table keys 92. When the search key hash indexes and the hash table keys 92 are matched, the storage buffer reader uses the storage buffer address 94 or addresses intermediate the matched hash table keys 92 to locate the requested lost data. The use of the above hash table search process may facilitate and speed up the whole re-transmitter process.

A number of embodiments of the present invention have been described. It will be understood that various modifications may be made without departing from the scope of the invention. Therefore, other implementations are within the scope of the following claims defining the invention.

The invention claimed is:

1. A method for retransmission of data packets, wherein the data packets are sent in data frames, each data frame comprising a checksum but lacking a unique sequence number, during a data transmission of a session between a data transmitter and a receiving device, the method comprising the steps of:
    detecting data loss in the data stream transmission;
    determining checksums of at least the received data frames that are directly adjacent to and enclosing the detected data loss;
    sending an identification key comprising said determined checksums to a retransmission server, whereby the sent checksums constitute a checksum sequence and said identification key is used by the server for identifying the data loss;
    receiving the requested missing data, comprising at least one data frame, from the retransmission server;
    interleaving the received at least one data frame in the correct place in the received data transmission before rendering the data information of the data transmission.

2. The method according to claim 1, wherein more checksums than the two checksums of the two received adjacent data frames enclosing the detected data loss are detected and sent to the retransmission server as an identification key thereby facilitating the identification of the correct data loss.

3. The method according to claim 1, wherein the identification key comprises time stamps of said checksums, each time stamp corresponding to a data frame and its checksum recorded at the reception of the data frame.

4. The method according to claim 1, wherein the sending of the identification key is performed by including said identification key in a Request message which is sent to the retransmission server.

5. The method according to claim 1, wherein the data transmission is a User Datagram Protocol stream.

6. The method according to claim 1, wherein the session is an IPTV transmission utilizing Moving Picture Expert Group 2-Transport stream (MPEG-TS) and the data transmitter is a Media server.

7. The method according to claim 1, wherein each data packet is a Moving Picture Expert Group 2-Transport stream (MPEG-TS) unit having a continuity number which is used for detecting data loss in the data transmission in the detecting step.

8. A receiving device for receiving retransmission of data packets, wherein the data packets are sent in data frames, each data frame comprising a checksum but lacking a unique sequence number, during a data transmission of a session from a data transmitter to the receiving device, the receiving device comprising:
    detecting means for detecting data loss in the data stream transmission;
    determining means for determining the checksums of at least the received data frames that are directly adjacent to and enclosing the detected data loss;
    sending means for sending adapted to send an identification key comprising said determined checksums to a retransmission server, whereby the sent checksums constitute a checksum sequence and said identification key is used by the server for identifying the data loss;
    receiving means for receiving the requested missing data comprising at least one data frame from the retransmission server;
    interleaving means for interleaving said received at least one data frame in the correct place in the received data transmission before rendering the data information of the data transmission.

9. The receiving device according to claim 8, wherein more checksums than the two checksums of the two received adjacent data frames enclosing the detected data loss are detected and sent to the retransmission server as an identification key thereby facilitating the identification of the correct data loss.

10. The receiving device according to claim 8, wherein the identification key is also comprising the time stamps of said checksums, each time stamp corresponding to a data frame and its checksum recorded at the reception of the data frame.

11. The receiving device according to claim 8, wherein the sending means being adapted to include said identification key in a Request message which is sent to the retransmission server.

12. The receiving device according to claim 8, wherein the data transmission is a User Datagram Protocol stream.

13. The receiving device according to claim 8, wherein the session is an IPTV transmission utilizing Moving Picture Expert Group 2-Transport stream (MPEG-TS) and the data transmitter is a Media server.

14. The receiving device according to claim 13, wherein each data packet is a Moving Picture Expert Group 2-Transport stream (MPEG-TS) unit having a continuity number which is used for detecting data loss in the data transmission by the detecting means.

15. A retransmission server for retransmission of data packets, wherein the data packets are sent in data frames, each data frame comprising a checksum but lacking a unique sequence number, during a data transmission of a session from a data transmitter to at least one receiving device, the retransmission server comprising:
a buffer storage; and
means for storing the sent data frames in the buffer storage, wherein the retransmission server is adapted for receiving an identification key from a retransmission requesting receiving device, said identification key identifying a data loss in the sent data frames using checksums that are directly adjacent to and enclose the data loss, whereby the received checksums constitute a checksum sequence, and said identification key is used by the retransmission server for identifying a stored data frame corresponding to the data loss, the retransmission server being further adapted for sending the identified stored data frame to the requesting receiving device.

16. The retransmission server according to claim 15, said server further comprising a buffer storage reader for identifying the stored data frame by means of said identification key and copying said data frame for retransmission to the requesting receiving device.

17. The retransmission server according to claim 15, comprising a transceiver block for handling the reception of request messages that comprise the identification key and for sending response messages comprising the requested data frame, which are detected by the requesting device as missing data.

18. The retransmission server according to claim 15, wherein the identification key comprises more checksums than the two checksums of the two received adjacent data frames enclosing a detected data loss thereby facilitating the identification of the correct data loss.

19. The retransmission server according to claim 15, wherein the identification key further comprises the time stamps of said checksums, each time stamp corresponding to a data frame and the data frame's checksum recorded at the reception of the data frame.

20. The retransmission server according to claim 15, wherein the buffer storage is a ring buffer, keeping the stored frames only for a predetermined length of time, denoted by a sliding time window.

* * * * *

UNITED STATES PATENT AND TRADEMARK OFFICE
CERTIFICATE OF CORRECTION

PATENT NO. : 9,065,980 B2  
APPLICATION NO. : 13/499806  
DATED : June 23, 2015  
INVENTOR(S) : Mangs et al.

Page 1 of 1

It is certified that error appears in the above-identified patent and that said Letters Patent is hereby corrected as shown below:

Specification

In Column 2, Line 38, delete "means (being" and insert -- means being --, therefor.

In Column 5, Line 54, delete "than" and insert -- then --, therefor.

Claims

In Column 12, Lines 17-18, in Claim 18, delete "comprises more checksums than the two checksums of the two" and insert -- comprises at least two checksums of two corresponding --, therefor.

In Column 12, Line 20, in Claim 18, delete "identification of the correct data loss." and insert -- identification of data frames in the buffer storage that correspond to the detected data loss. --, therefor.

Signed and Sealed this  
Fifth Day of April, 2016

Michelle K. Lee  
*Director of the United States Patent and Trademark Office*